Figure 1:
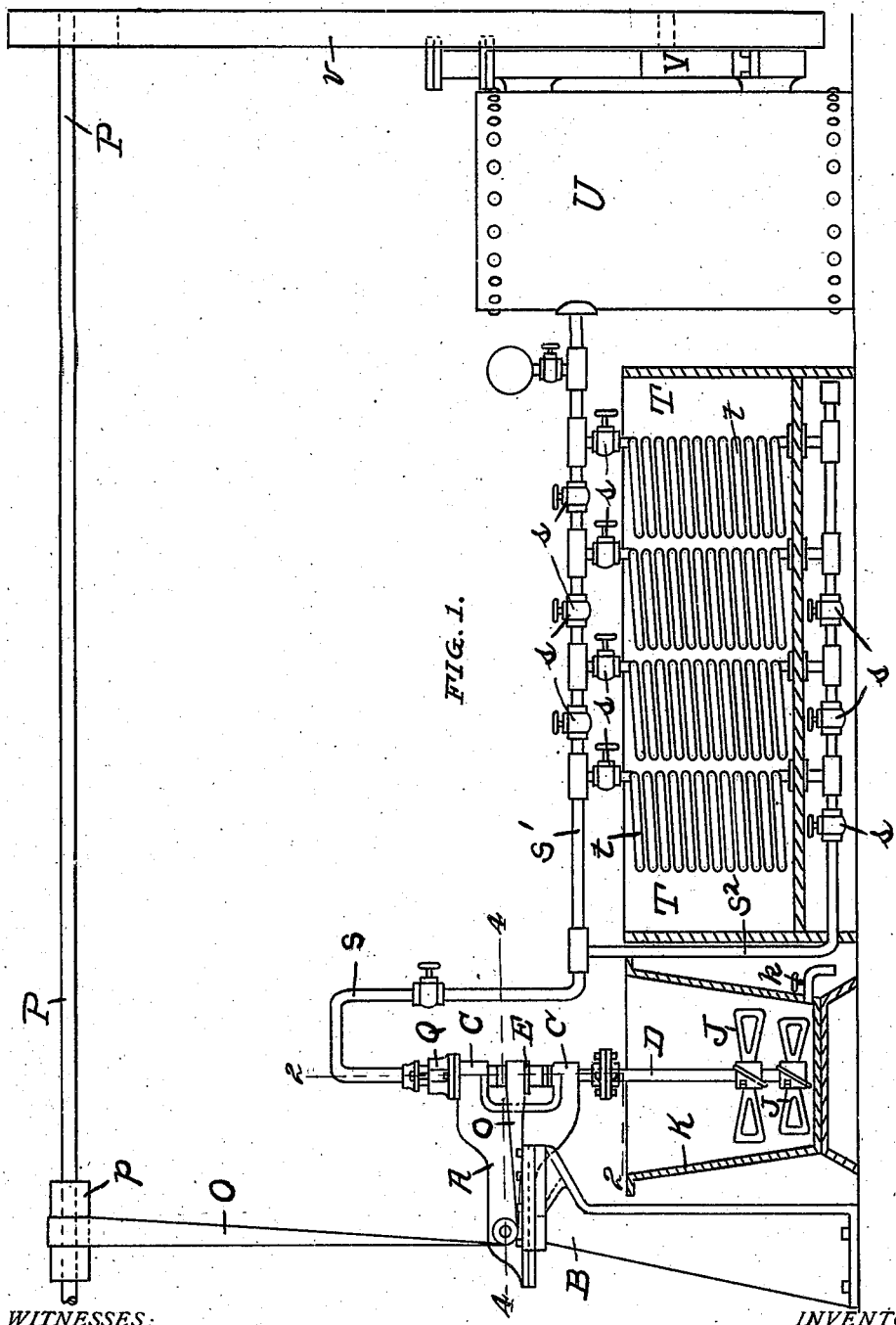

No. 847,562. PATENTED MAR. 19, 1907.
A. FAY.
METHOD OF TREATING BUTTER.
APPLICATION FILED OCT. 8, 1906.

2 SHEETS—SHEET 1.

WITNESSES:
Alexander Reid
Olive Sprau

INVENTOR.
Alpheus Fay
BY
Brayton G. Richards
ATTORNEY.

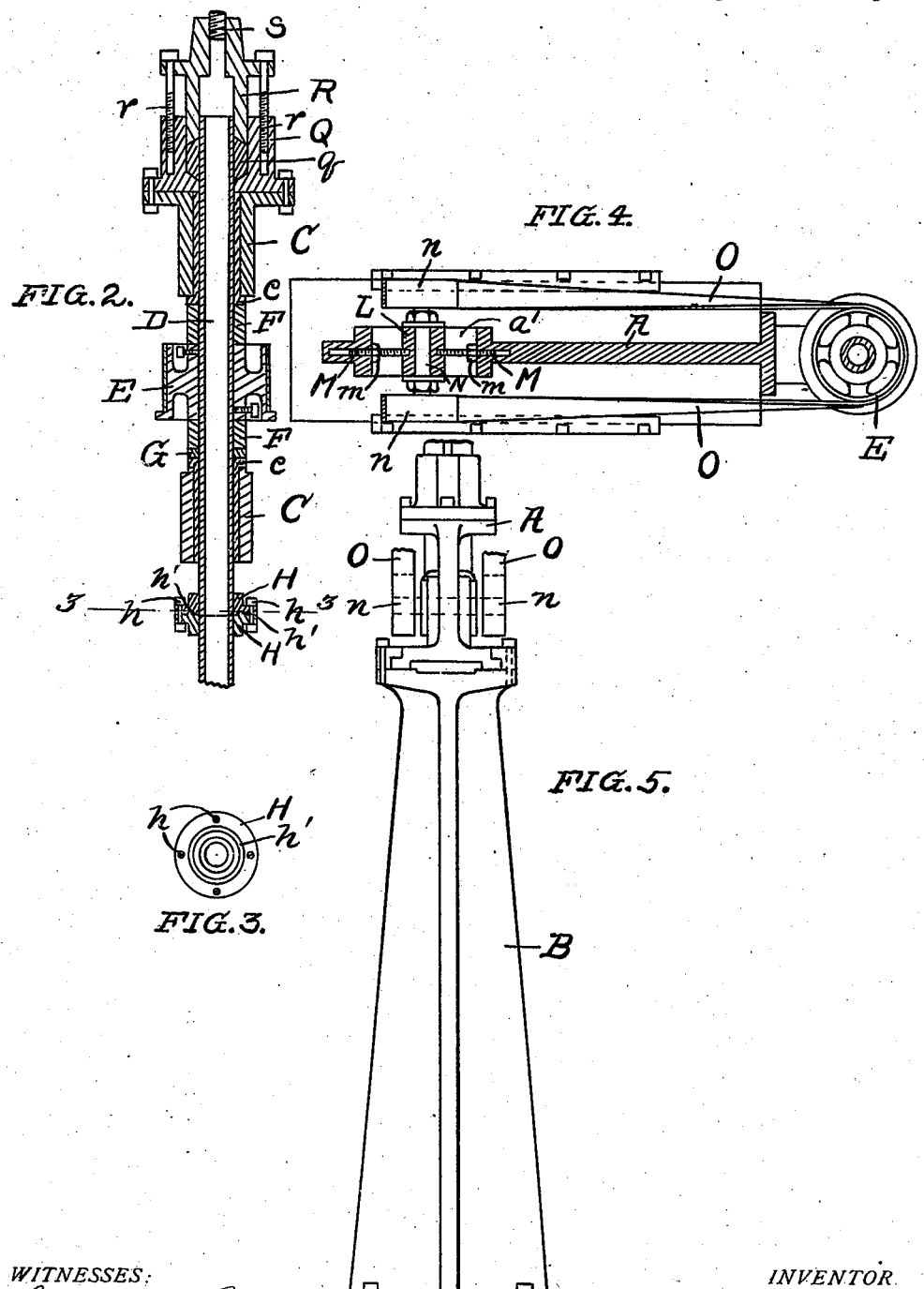

UNITED STATES PATENT OFFICE.

ALPHEUS FAY, OF LOUISVILLE, KENTUCKY.

METHOD OF TREATING BUTTER.

No. 847,562.  Specification of Letters Patent.  Patented March 19, 1907.

Application filed October 8, 1906. Serial No. 338,035

*To all whom it may concern:*

Be it known that I, ALPHEUS FAY, a citizen of the United States, residing at Louisville, in the county of Jefferson and State of Kentucky, have invented a certain new and useful Method for Treating Butter, of which the following is a specification.

The object of my invention is to provide an improved method for treating butter, whereby the butter may be improved in quality and rendered pure, sweet, and palatable.

My invention consists in method hereinafter described and claimed.

In the drawings, Figure 1 is a side elevation of apparatus for employing my method; Fig. 2, an enlarged section on line 2 2 of Fig. 1; Fig. 3, a section on line 3 3 of Fig. 2; Fig. 4, an enlarged section on line 4 4 of Fig. 1; and Fig. 5, an enlarged end view of the apparatus.

A head A is slidably mounted on a standard B and provided with bearings C, in which are mounted the hollow shaft D. The bearings C are preferably provided with bronze bushings $c$ to reduce friction. A pulley E is secured to shaft D between bearings C and collars F, interposed between the hub of pulley E and bushings $c$. A fiber washer G is preferably interposed between the lower collar F and bushing $c$ to reduce friction. The shaft D is made in two sections secured together by means of plates H, which are threaded to the ends of the shaft-sections and secured together by bolts $h$. In order to insure perfect alinement between the shaft-sections, one of the plates H is provided with an annular rib $h'$, taking into a corresponding socket in the other plate. The lower section of shaft D carries agitators J, operating in vessel K, which contains the butter to be treated. The vessel K is preferably made of cast-iron, lined with enamel, and is provided with a faucet $k$ for draining. It will be seen that by uncoupling the lower section of shaft D the vessel K may be readily removed or replaced in position and that the annular rib $h'$ insures perfect alinement of the shaft-sections when recoupled.

At the rear head A is provided with a bearing-block L, slidably mounted in a slot $a'$ and rendered adjustable in position by means of threaded shafts M and lock-nuts $m$. Block L carries a shaft N, on which pulleys $n$ are loosely mounted, and a belt O passes over pulleys E and $n$ to a pulley $p$ on shaft P to drive shaft D. The pulley $p$ is considerably wider than the belt O, so as to carry the belt when in different positions. By this arrangement the head A may be adjusted to different positions to accommodate different sizes of vessels K, the tension in the belt being adjusted by means of nuts $m$.

The upper bearing C carries a packing-casing Q, in which the upper end of shaft D terminates. A packing-ring $q$ is placed in casing Q around shaft D and is compressed against the shaft by means of cap R, which may be drawn into the casing by means of screw-bolts $r$. An air-pipe S is fitted into cap R, so as to supply air to hollow shaft D while rotating. The pipe S connects with pipes $S'$ and $S^2$, which pass above and below coils $t$ in tank T. The ends of the coils are connected with pipes $S'$ and $S^2$ and stop-cocks $s$ provided, so that air in pipe $S'$ may be delivered directly to pipe S or sent through one or more of coils $t$ before reaching pipe S. A cooling medium is placed in tank T, and it will be seen that the air delivered to pipe S, and thus to shaft D, may be cooled to different degrees of temperature by passing it through one or more of the coils $t$. Pipe $S'$ connects with air-tank U, which is supplied with air under pressure by means of a pump V, driven by a belt $v$ from shaft P.

In operation the butter to be treated, which may be of a poor quality or even slightly rancid, is placed in vessel K with a solution or mixture containing pure milk or cream elements. This solution or mixture may be fresh sweet milk or cream, or fresh sweet milk or cream from which the butter has been removed, or it may be buttermilk. The mixture is then thoroughly mixed and agitated by means of agitators J and cooled air from pipe S passed into the mixture to bring it to a temperature of from 35° to 40° Fahrenheit. By this arrangement a nice and permanent regulation of the temperature may be maintained. The agitation naturally tends to raise the temperature, while the cool air tends to lower it, so that it will be seen that by regulating the amount of cool air and the intensity of agitation the temperature may be nicely and permanently adjusted. The agitation will also remove any butter originally contained in the milk and add it to that placed therein. This treatment is continued for from twenty-five to thirty minutes, during which the butter is thoroughly broken up, remixed with the pure milk elements, and purified by the air. The solid milk elements in the solution are separated therefrom and absorbed by the butter, thus rendering it sweet and palatable and increasing its weight considerably. If desired, coloring-matter may be added to the solution, from which it will be absorbed by the butter being treated. A poor quality of butter thus treated becomes perfectly sweet, pure, and palatable. After this treatment is finished warm air is supplied until the mixture is about 55° Fahrenheit, when the supply of air is cut off and the butter particles regathered by a running of the shaft D slowly for a few minutes, when it may be washed and treated with salt in the usual manner.

While I have described the preferred apparatus and method of proceeding for carrying my invention into effect, these are capable of modification without departing from the spirit of the invention. I therefore do not wish to be limited to the apparatus set forth or to the exact steps enumerated; but

What I claim as new, and desire to secure by Letters Patent, is—

1. The method of treating butter, which consists in placing the butter in a liquid containing pure milk elements and then mechanically agitating the mixture while it is maintained at a low termperature and air is being passed through it, substantially as specified.

2. The method of treating butter, which consists in placing the butter in a liquid containing pure milk elements; then mechanically agitating the mixture while it is maintained at a low temperature and air is being passed through it; and then increasing the temperature of the mixture and collecting the butter by gentle agitation, substantially as specified.

3. The method of treating butter, which consists in placing the butter in a liquid containing pure milk elements; then mechanically agitating the mixture while it is maintained at a low temperature and air under pressure is being passed through it; and then increasing the temperature of the mixture and collecting the butter by gentle agitation, substantially as specified.

4. The method of treating butter, which consists in placing the butter in a liquid containing pure milk elements; then mechanically agitating the mixture while cooled air is being passed through it; and then increasing the temperature of the mixture and collecting the butter by gentle agitation, substantially as specified.

5. The method of treating butter, which consists in placing the butter in a liquid containing pure milk elements; then mechanically agitating the mixture while cooled air under pressure is being passed through it, and then increasing the temperature of the mixture and collecting the butter by gentle agitating, substantially as specified.

6. The method of treating butter, which consists in placing the butter in a liquid containing pure milk elements; then mechanically agitating the mixture while cooled air is being passed through it; then increasing the temperature of the mixture by passing warmer air through it; and then collecting the butter by gentle agitation, substantially as specified.

7. The method of treating butter, which consists in placing the butter in a liquid containing pure milk elements; then mechanically agitating the mixture while cooled air is being passed through it; then increasing the temperature of the mixture by passing warmer air through it; then discontinuing the supply of air; and then collecting the butter by gentle agitation, substantially as specified.

ALPHEUS FAY.

Witnesses:
 ALEXANDER REID,
 BRAYTON G. RICHARDS.